United States Patent
Schintzel et al.

(10) Patent No.: US 9,394,871 B2
(45) Date of Patent: Jul. 19, 2016

(54) METHOD AND DEVICE FOR INJECTING FUEL INTO A COMBUSTION CHAMBER

(75) Inventors: Kay Schintzel, Destedt (DE); Lars Hentschel, Braunschweig (DE); Jörg Theobald, Lehre (DE); Andreas Thaysen, Wolfsburg (DE); Feitse Ebus, Braunschweig (DE)

(73) Assignee: VOLKSWAGEN AKTIENGELLSCHAFT, Wolfsburg (DE)

( * ) Notice: Subject to any disclaimer, the term of this patent is extended or adjusted under 35 U.S.C. 154(b) by 249 days.

(21) Appl. No.: 14/115,832

(22) PCT Filed: Apr. 26, 2012

(86) PCT No.: PCT/EP2012/001790
§ 371 (c)(1),
(2), (4) Date: Feb. 14, 2014

(87) PCT Pub. No.: WO2012/146378
PCT Pub. Date: Nov. 1, 2012

(65) Prior Publication Data
US 2014/0251274 A1 Sep. 11, 2014

(30) Foreign Application Priority Data

Apr. 29, 2011 (DE) .......................... 10 2011 018 949
Mar. 20, 2012 (DE) .......................... 10 2012 005 456

(51) Int. Cl.
| F02M 61/18 | (2006.01) |
|---|---|
| F02B 23/10 | (2006.01) |
| F02D 41/38 | (2006.01) |
| F02M 69/04 | (2006.01) |
| F02B 17/00 | (2006.01) |
| F02B 75/12 | (2006.01) |
| F02D 41/40 | (2006.01) |

(52) U.S. Cl.
CPC .......... F02M 61/1806 (2013.01); F02B 23/104 (2013.01); F02D 41/38 (2013.01);
(Continued)

(58) Field of Classification Search
CPC ............. F02B 23/104; F02B 2023/103; F02B 2075/125; F02B 17/005; F02M 61/1806
USPC .................................. 123/445, 295, 299, 305
See application file for complete search history.

(56) References Cited

U.S. PATENT DOCUMENTS 6,802,296 B2 * 10/2004 Arndt .................... F02B 23/104
123/299
7,418,940 B1 * 9/2008 Yi ........................ F02B 17/005
123/295

(Continued)

FOREIGN PATENT DOCUMENTS

| AT | 508 578 A2 | 2/2011 |
|---|---|---|
| DE | 100 32 330 A1 | 1/2002 |

(Continued)

OTHER PUBLICATIONS

International Search Report for International Application No. PCT/EP2012/001790, dated Oct. 31, 2012.

*Primary Examiner* — Mahmoud Gimie
(74) *Attorney, Agent, or Firm* — Pearl Cohen Zedek Latzer Baratz LLP

(57) ABSTRACT

When fuel is injected into a combustion chamber (2) of a cylinder (13) of an engine (30) of a vehicle (10), the fuel is injected in the form of multiple jets (3) with the aid of an injector (1). In this connection, a first plane is defined in which both the central axis (11) of the injector (1) and the central axis (12) of the cylinder (13) lie. Furthermore, a second plane is defined in which both the central axis (11) of the injector (1) and the surface normal of the first plane lie. The jets (3) are generated in such a way that for each jet pair, which is formed from two of the jets (3), an angle between the projections of the two central axes of the two jets of the jet pair into the second plane is smaller than 50°.

13 Claims, 7 Drawing Sheets

(52) U.S. Cl.
CPC ............ *F02M 69/04* (2013.01); *F02B 17/005* (2013.01); *F02B 23/101* (2013.01); *F02B 2023/103* (2013.01); *F02B 2075/125* (2013.01); *F02D 41/402* (2013.01); *F02D 2041/389* (2013.01); *F02M 61/1813* (2013.01)

(56) References Cited

U.S. PATENT DOCUMENTS

| | | | |
|---|---|---|---|
| 7,770,556 | B2 | 8/2010 | Kihara et al. |
| 2003/0234006 | A1* | 12/2003 | Saito ................. F02M 51/0671 123/467 |
| 2006/0207550 | A1 | 9/2006 | Saito et al. |
| 2011/0162621 | A1* | 7/2011 | Xu ....................... F02B 23/104 123/305 |

FOREIGN PATENT DOCUMENTS

| | | |
|---|---|---|
| DE | 10 2004 002 296 A1 | 8/2005 |
| DE | 10 2004 041 031 A1 | 3/2006 |
| JP | 2003 269176 A | 9/2003 |
| JP | 2007092633 A | 12/2007 |
| WO | WO 02/02928 A1 | 1/2002 |
| WO | WO 2005/075815 A1 | 8/2005 |
| WO | WO 2012/045850 A3 | 7/2012 |

* cited by examiner

METHOD AND DEVICE FOR INJECTING FUEL INTO A COMBUSTION CHAMBER

CROSS-REFERENCE TO RELATED APPLICATIONS

This application is a National Phase Application of PCT International Application No. PCT/EP2012/001790, International Filing Date Apr. 26, 2012, claiming priority from German Patent Application No. 10 2011 018 949.1, filed Apr. 29, 2011, which are hereby incorporated by reference.

FIELD OF THE INVENTION

The present invention relates to a method for the targeted injection of fuel into a combustion chamber of a cylinder of an internal combustion engine of a vehicle as well as an accordingly designed device, an accordingly designed engine and an accordingly designed vehicle.

BACKGROUND OF THE INVENTION

The injection of fuel into a combustion chamber using multiple jets is well known from the related art; see, for example, DE 100 32 330 A1, DE 10 2004 041 031 A1, DE 10 2004 002 296 A1, U.S. Pat. No. 7,770,556 B2 or JP 2007092633 A.

According to the related art, the injection of fuel is carried out in such a way that, to the extent possible, the spark plug and the valves of the cylinder are not wetted by the injected fuel (see in particular DE 100 32 330 A1, DE 10 2004 041 031 A1 and DE 10 2004 002 296 A1). The problem of wall wetting during injection of the fuel is also discussed in the publications DE 10 2004 041 031 A1 and DE 10 2004 002 296 A1.

SUMMARY OF THE INVENTION

Based on this related art, the object of the present invention is to inject the fuel into the combustion chamber in the form of multiple jets in such a way that at least
  no wetting of the running surface of the cylinder occurs,
  no valve disk of valves projecting into the cylinder is wetted,
  the piston is not wetted, and
  the combustion chamber cover is not wetted.

According to the present invention, this objective is achieved by a method for injection of fuel into a combustion chamber of a cylinder of an engine of a vehicle as recited in Claim 1, by a device for injecting fuel into a combustion chamber of a cylinder of an engine of a vehicle as recited in Claim 8, by an engine as recited in claim 11 and by a vehicle as recited in Claim 12. The dependent claims define preferred and advantageous specific embodiments of the present invention.

Within the scope of the present invention, a method for injection of fuel into a combustion chamber of a cylinder of an engine of a vehicle is provided. In this connection, the fuel is injected into the combustion chamber in the form of multiple jets with the aid of an injector. A first plane is defined in such a way that both the central axis of the injector and the central axis of the cylinder lie in this first plane; the first plane is thus virtually spanned by the central axis of the injector and the central axis of the cylinder. A second plane, which lies perpendicularly to the first plane, is defined in such a way that both the central axis of the injector and the surface normal of the first plane lie in this second plane, so that this second plane is thus virtually spanned by the central axis of the injector and by the surface normal of the first plane. The jets are generated in such a way that an angle ($\phi$) between the projections of the two central axes of any two of the jets into the second plane is smaller than 50°.

This limitation to 50° advantageously ensures that none of the jets wets the cylinder running surface (cylinder wall along which the piston moves).

The inventors of the present invention have carried out numerous simulations and experiments in order to determine a spray geometry (specific system of the injection jets), which on the one hand fulfills the above-defined objectives as optimally as possible, and on the other hand generates a fuel-air mixture within the cylinder, the volume of the combustion chamber being nonetheless optimally utilized. The result of the inventors' simulations and experiments is a specific spray geometry having five holes and a specific spray geometry having four holes.

In order to define a spray geometry, each jet (and accordingly each hole) is defined by a first angle and by a second angle. In this connection, the first angle lies between a projection of the central axis of the particular jet into the first plane and the central axis of the injector. The second angle lies between the projection of the central axis of the particular jet into the second plane and the central axis of the injector.

In the case of the spray geometry having exactly five holes, the fuel is sprayed into the combustion chamber (in particular simultaneously) using exactly five jets, so that a first, a second, a third, a fourth and a fifth jet exist. Table 1 below represents where the individual jets of the optimal 5-jet system according to the present invention are located with regard to the central axis of the injector in each case.

TABLE 1

| optimal 5-jet system | | | | |
|---|---|---|---|---|
| | first angle ($\alpha$) | | second angle ($\beta$) | |
| | optimal | tolerance range | optimal | tolerance range |
| 1st jet | 0° | −3° to +3° | 0° | −3° to +3° |
| 2nd jet | −28° | −40° to −20° | −28° | −40° to −20° |
| 3rd jet | −10° | −20° to −5° | −25° | −40° to −20° |
| 4th jet | +10° | +5° to +20° | −25° | −40° to −20° |
| 5th jet | +28° | +20° to +40° | −28° | −40° to −20° |

In the case of the spray geometry having exactly four holes, the fuel is sprayed into the combustion chamber (in particular simultaneously) via exactly four jets, so that a first, a second, a third and a fourth jet exist. Table 2 represents which first or second angle these four jets form with the central axis of the injector.

TABLE 2

| optimal 4-jet system | | | | |
|---|---|---|---|---|
| | first angle ($\alpha$) | | second angle ($\beta$) | |
| | optimal | tolerance range | optimal | tolerance range |
| 1st jet | 0° | −3° to +3° | 0° | −3° to +3° |
| 2nd jet | −21° | −24° to 18° | −28° | −31° to −25° |
| 3rd jet | 0° | −3° to +3° | −22° | −25° to −19° |
| 4th jet | +21° | +18° to +24° | −28° | −31° to −25° |

In the case of the spray geometry having exactly six holes, the fuel is sprayed into the combustion chamber (in particular simultaneously) via exactly six jets, so that a first, a second, a third, a fourth, a fifth and a sixth jet exist. Table 3 represents which first or second angle these six jets form with the central axis of the injector.

TABLE 3 optimal 6-jet system

| | first angle (α) | | first angle (β) | |
|---|---|---|---|---|
| | optimal | tolerance range | optimal | tolerance range |
| 1st jet | 0 | −3° to +3° | −2 | −3° to +3° |
| 2nd jet | −30 | −40° to −20° | −27 | −40° to −20° |
| 3rd jet | −11 | −20° to −5° | −24 | −40° to −20° |
| 4th jet | 11 | +5° to +20° | −24 | −40° to −20° |
| 5th jet | 30 | +20° to +40° | −27 | −40° to −20° |
| 6th jet | 0 | −3° to +3° | −40 | −45° to −30° |

It is advantageously the case for each jet pair that an angle between the two central axes of the two jets of the jet pair is larger than 15° (preferably 20°).

It should be pointed out that this angle of more than 15° (20°) is not limited to the first or second plane, but instead that this angle to be maintained virtually applies to the plane which is spanned from the two central axes of the particular two jets.

By maintaining the above-named minimum angle, it is advantageously ensured that two adjacent jets do not lie so close together that their jets virtually reinforce one another. If, namely, two jets lie too close together, a penetration of the corresponding fuel jets would disadvantageously be too great, so that the fuel would be injected too far into the combustion chamber, so that it could, for example, wet the cylinder running surface.

According to a preferred specific embodiment of the present invention, the jets are injected into the combustion chamber at a pressure greater than 200 bar (preferably more than 250 bar). Furthermore, a special injection timing may be used for operating the engine, the injection jets being injected as a function of the piston position and the position of the intake valve (the lift of the intake valve).

The high injection pressure of 200 bar (or even 250 bar) advantageously avoids wetting the piston or the intake valve and also reduces particle emissions (in the exhaust gas). Due to the lateral injection position, the present invention also offers the possibility of using common-rail injectors having injection pressures of up to 800 bar, which are known, for example, for the diesel engine.

Furthermore, according to the present invention, multiple injection is possible, which means that each of the (for example, four or five) jets is injected multiple times during the same combustion stroke.

The multiple injection further optimizes the vaporization and fuel-mixture generation in the cylinder, resulting in an improvement of, in particular, the cold start and emissions performance.

Within the scope of the present invention, a device (for example, a fuel injection system) for injection of fuel into a combustion chamber of a cylinder of an engine of a vehicle is also provided. In this connection, the device includes an injector (i.e., a fuel injection device) and a hole system (for example, a surface), which has multiple holes passing through the hole system or surface. The device is designed in such a way that the injector injects the fuel through the multiple holes of the hole system into the combustion chamber. The holes are situated in such a way that for any hole pair, which is formed from any two of the holes, an angle between the two projections of the central axes of these two holes into the second plane is smaller than 50°. If a fuel jet is sprayed into the combustion chamber through a hole of the hole system with the aid of the injector, the central axis of this hole corresponds in particular to the central axis of this jet. Therefore the direction of the central axis of the particular hole corresponds to the direction of the central axis of the jet which may be generated via the hole.

The advantages of the device according to the present invention are essentially the same as the advantages of the method according to the present invention, which was explained in greater detail above, so that a repetition may be omitted here.

Within the scope of the present invention, an engine is also provided which includes a device according to the present invention.

Finally, within the scope of the present invention, a vehicle is provided which includes a device according to the present invention and/or an engine according to the present invention.

Through the present invention the fuel is injected into the combustion chamber in such a way that neither the cylinder running surface nor the combustion chamber cover nor the piston is wetted by the injected fuel. This advantageously results in a reduction of particle emissions, an avoidance of carbonization, an avoidance of lubricant oil dilution and an increase in the rate of combustion of the fuel-air mixture forming in the combustion chamber. In other words, the spray pattern of the high-pressure injectors or the system of the individual injection jets according to the present invention is designed in such a way that a wetting by fuel of the intake valves, the piston and the cylinder liners is avoided with the aid of a special high-pressure injector design and a very high charge movement without a flap system in the intake manifold.

Through the present invention the hydrocarbons present in the vicinity of the cylinder wall (wall-quenching) and accordingly the pollutant emissions are significantly reduced. This results not least from a significant reduction of the penetration of the fuel jets. In order to reduce the particle emissions further, a combination of intake-manifold and direct injection may be implemented. Furthermore, it is possible to implement the engine using an intake camshaft adjuster and an exhaust camshaft adjuster to be able to implement the greatest possible overlaps and accordingly improve the torque at low speeds (low-end torque) and reduce fuel consumption and pollutant emissions (in particular particle emissions and hydrocarbon emissions). The increase of the charge movement results in an increase of the turbulent kinetic energy in the cylinder of the engine. Another advantage of the present invention results from the reduction of deposits on the piston and combustion chamber cover, which in turn contributes to reducing the particle emissions.

The present invention is in particular suitable for a gasoline engine of a motor vehicle. Of course, the present invention is not limited to this preferred area of application, since the present invention may also be used in ships, airplanes as well as rail vehicles or track-guided vehicles. Furthermore, the present invention may at least in principle also be used in other engine types.

BRIEF DESCRIPTION OF THE DRAWINGS

The present invention will be described in greater detail in the following based on specific embodiments according to the present invention with reference to the drawings.

DETAILED DESCRIPTION OF THE INVENTION

Figure 1A:
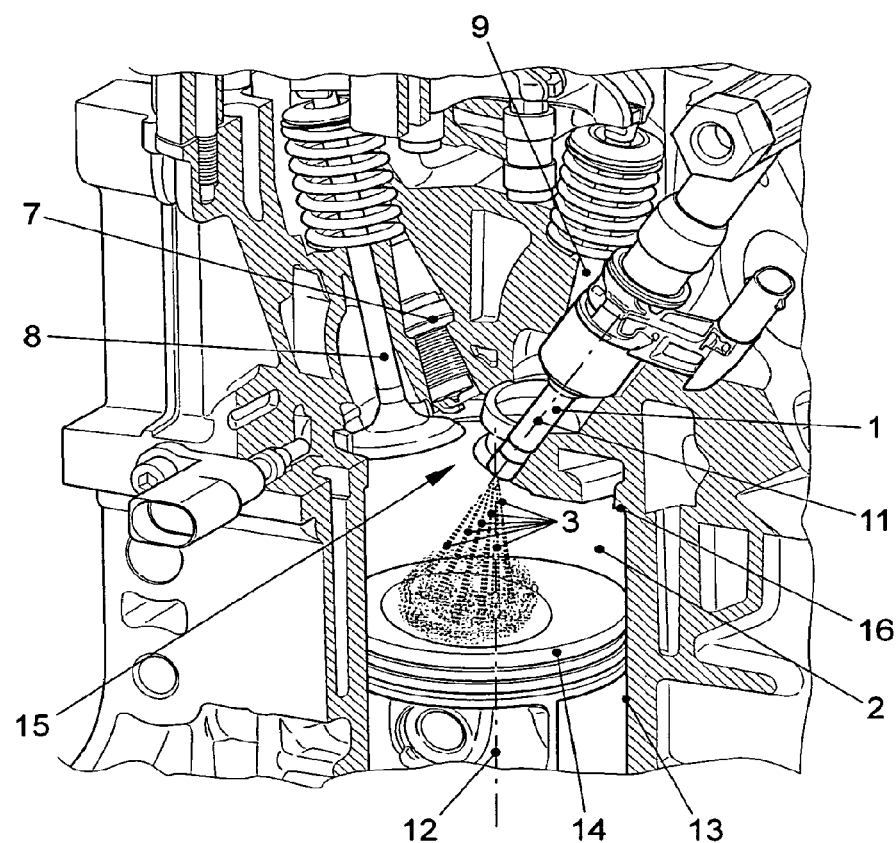
FIG. 1A shows the interior of a cylinder of a gasoline engine.

A combustion chamber 2 in the interior of a cylinder 13 of a gasoline engine is represented in FIG. 1A. A piston 14 moves within cylinder 13, so-called combustion chamber cover 15 being located diametrically opposed to piston 14. An intake valve 8, an exhaust valve 9, a spark plug 7, and an injector 1 extend into cylinder 13 and accordingly into combustion chamber 2. Based on the fact that central axis 11 of injector 1 forms an angle with central axis 12 of cylinder 13, it is apparent that the fuel is injected into cylinder 13 obliquely laterally. Beneath the combustion chamber cover is located a so-called spout or lower edge of the combustion chamber cover (a corresponding recess for installation of injector 1). During operation, injector 1 sprays fuel jets 3 into combustion chamber 2.

These fuel jets 3 occur as the result of the fuel being sprayed through corresponding holes of a hole system. If this hole system is represented as a surface of a segment of a sphere, the central axis of each hole which, for example, corresponds to a straight line, which runs through the center point of the corresponding sphere and through the center point of the corresponding hole, forms a relation with central axis 11 of injector 1, which may be expressed by first angle $\alpha$ and by second angle $\beta$.

Figure 1B:
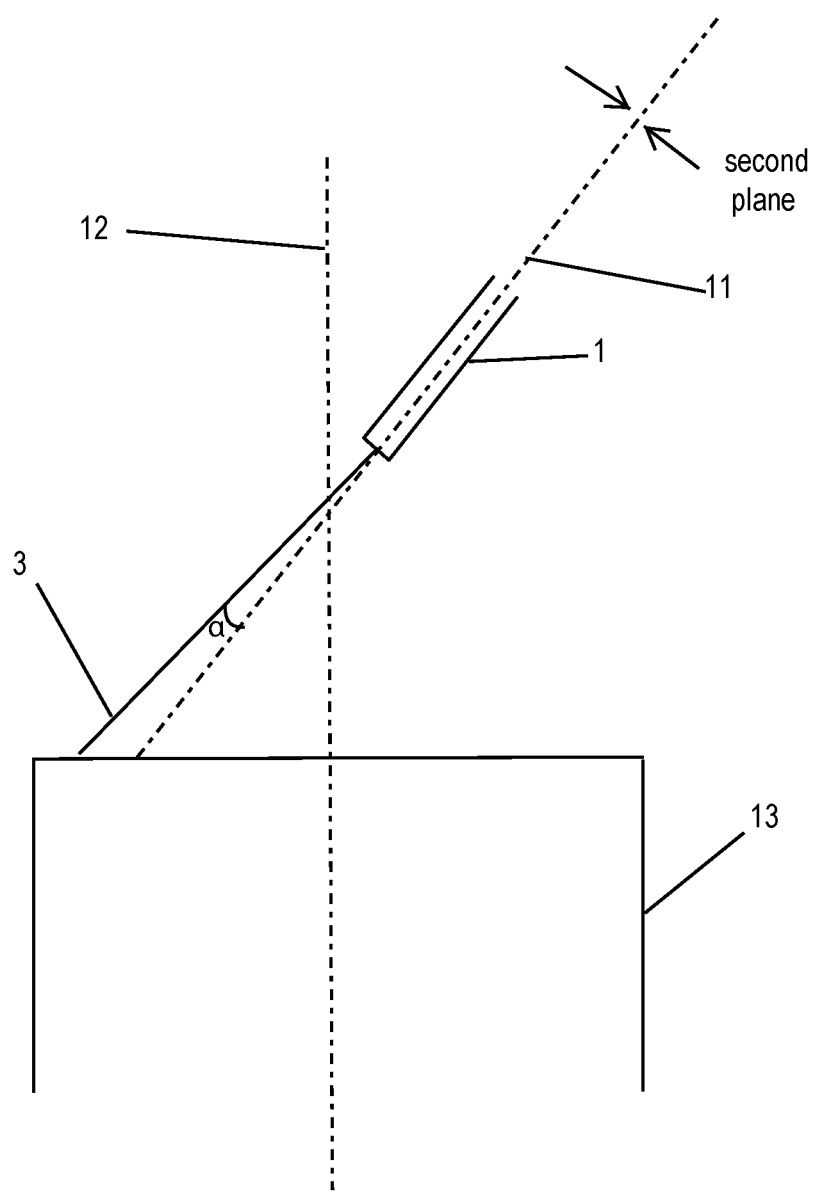
FIG. 1B is a schematic diagram of the injector and the cylinder, taken from a view facing the first plane.
Figure 1C:
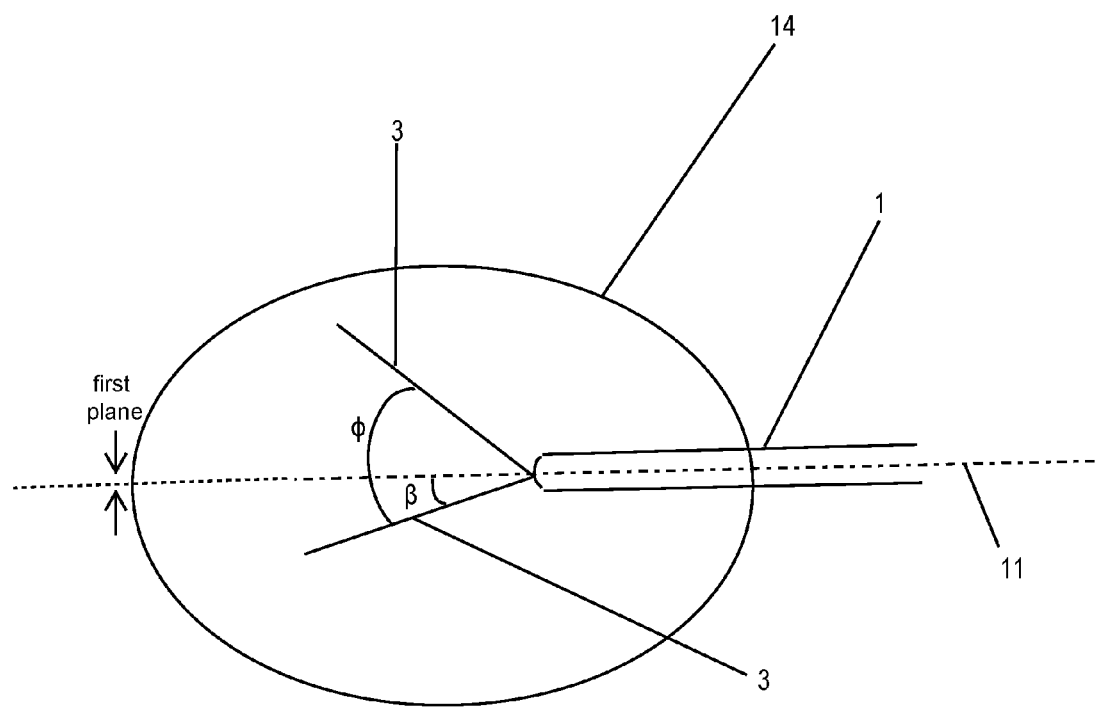
FIG. 1C is a schematic diagram of the injector and the cylinder, taken from a view facing the second plane.

In addition, a first and a second plane exist. The first plane is spanned from central axis 1 of injector 11 and from central axis 12 of cylinder 13. The second plane is perpendicular to the first plane and includes central axis 1 of injector 11, so that central axis 1 of injector 11 lies within both the first plane and the second plane. FIG. 1B shows a schematic diagram of the injector and the cylinder, taken from a view facing the first plane, and FIG. 1C is a schematic diagram of the injector and the cylinder, taken from a view facing down towards the piston. As seen in FIG. 1, angle $\phi$ corresponds to the angle between the projections of the two central axes of any two of the jets into the second plane. First angle $\alpha$ corresponds to an angle in the first plane, and second angle $\beta$ corresponds to an angle in the second plane. The central axis of a hole of the hole system corresponds to the central axis of the jet which is injected into combustion chamber 2 through this hole. Each hole and accordingly each jet are defined by first angle $\alpha$ and by second angle $\beta$. First angle $\alpha$ indicates the size of the angle between central axis 11 of injector 1 and the projection of the central axis of the particular hole (jet) in the first plane. In a similar way, second angle $\beta$ indicates the size of the angle between central axis 11 of injector 1 and the projection of the central axis of the particular hole (jet) in the second plane.

Figure 2:
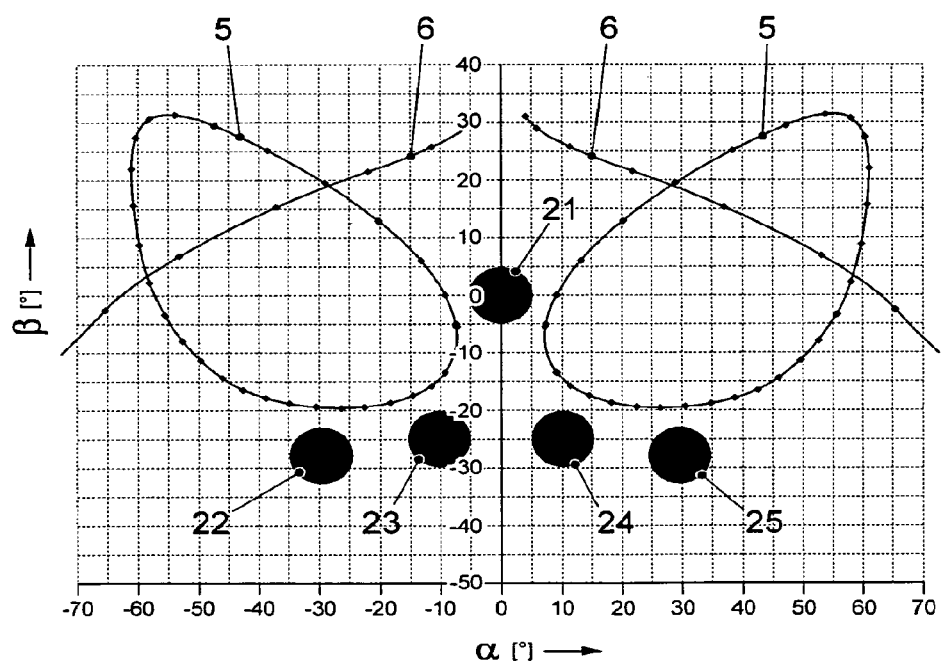
FIG. 2 shows the orientation of the injection jets of an injector having a 5-hole system according to the present invention.

The orientation of five jets 21 through 25 of the 5-hole system is represented in FIG. 2. In addition, valve lift curve 5 for intake valve 8 and exhaust valve 9 are each represented in FIG. 2. To prevent particular jet 21 through 25 from striking one of valves 8, 9 (or, more precisely, the valve disk of one of valves 8, 9) at any point in time, corresponding jet 21 through 25 must lie outside of closed valve lift curve 5, which is the case in the spray geometry according to the present invention shown in FIG. 2.

Furthermore, none of jets 21 through 25 should contact the lower edge of combustion chamber cover 15 (spout). For that purpose, jets 21 through 25 should lie beneath curve 6 which represents the curve of the lower edge of combustion chamber cover 15, which is also the case in the spray geometry according to the present invention shown in FIG. 2.

The diameter of one of jets 21 through 25 amounts to, for example, 150 µm.

Figure 3:
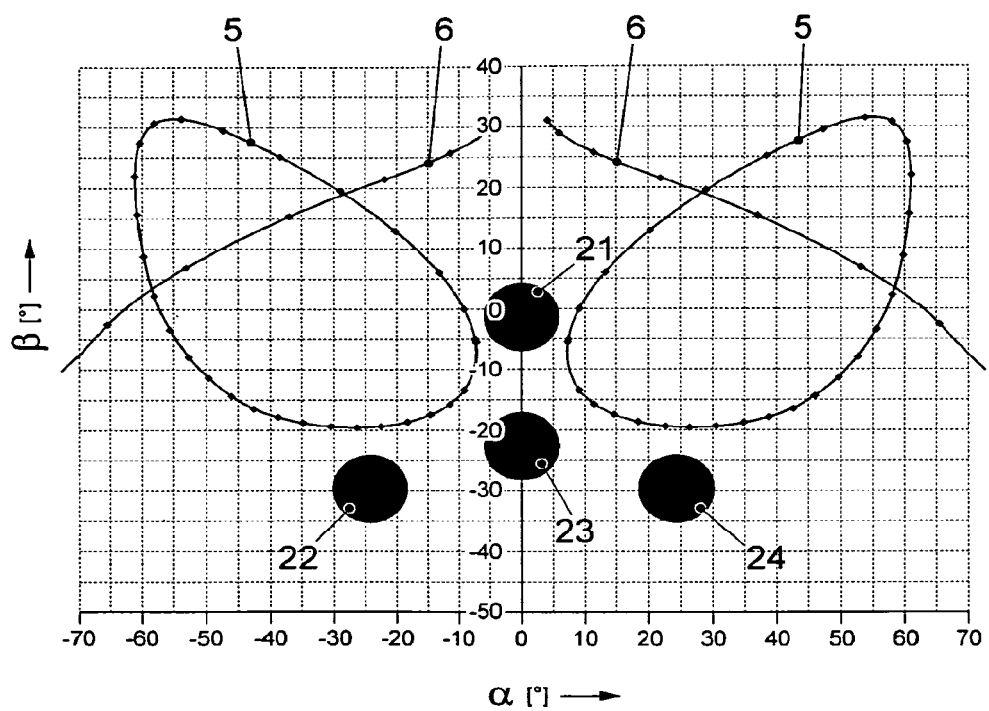
FIG. 3 shows the orientation of the injection jets of an injector having a 4-hole system according to the present invention.

The spray geometry for a 4-hole system according to the present invention is represented in FIG. 3. Compared to the 5-hole system depicted in FIG. 2, the 4-hole system depicted in FIG. 3 is more compact with respect to first angle $\alpha$.

Figure 4:
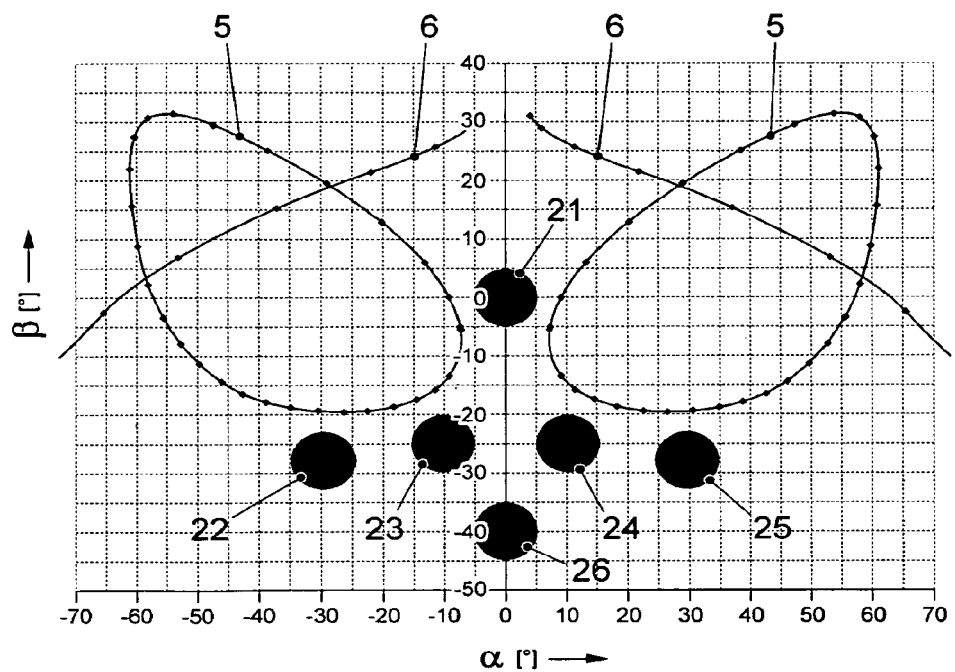
FIG. 4 shows the orientation of the injection jets of an injector having a 6-hole system according to the present invention.

The spray geometry for a 6-hole system according to the present invention is represented in FIG. 4. Compared to the 5-hole system depicted in FIG. 2, the 6-hole system depicted in FIG. 4 has been expanded with respect to the utilization of the combustion chamber by another jet 26. In this case also, it is ensured that neither the cylinder running surface nor the combustion chamber cover nor the piston is wetted by the injected fuel. This symmetrical form implements an improved number of injection holes.

Figure 5:
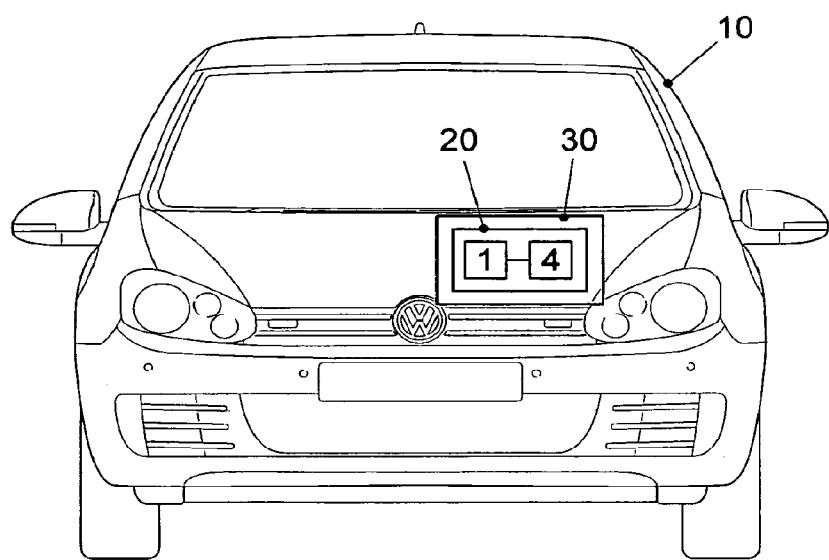
FIG. 5 schematically shows a vehicle according to the present invention having an engine according to the present invention.

Finally, a vehicle 10 according to the present invention is depicted schematically in FIG. 5. Vehicle 10 includes a gasoline engine 30 which has an injection device 20 according to the present invention. For its part, injection device 20 according to the present invention includes an injector 1 and a hole system 4.

What is claimed is:

1. A method for injecting fuel into a combustion chamber of a cylinder of an engine of a vehicle, comprising:
    injecting the fuel in the form of four, five or six jets via an injector, wherein a central axis of the injector and a central axis of the cylinder define a first plane, and the central axis of the injector and a surface normal of the first plane define a second plane,
    generating the four, five or six jets such that at least one jet pair is formed between any two of the four, five or six jets,
    wherein an angle ($\phi$) between a projection of a central axis of one jet of the at least one jet pair into the second plane and a projection of a central axis of the other jet of the at least one jet pair into the second plane is smaller than 50°.

2. The method as recited in claim 1, further comprising injecting the fuel in the form of a first, a second, a third, a fourth and a fifth jet,
    wherein a direction of each of the jets is defined by a first angle ($\alpha$) between the central axis of the injector and a projection of the central axis of the jet into the first plane and by a second angle ($\beta$) between the central axis of the injector and a projection of the central axis of the jet into the second plane, and
    wherein
    the first angle of the first jet lies in an angular range of −3° to +3°,
    the second angle of the first jet lies in an angular range of −3° to +3°,
    the first angle of the second jet lies in an angular range of −40° to −20°, the second angle of the second jet lies in an angular range of −40° to −20°, the first angle of the third jet lies in an angular range of −20° to −5°, the second angle of the third jet lies in an angular range of −40° to −20°, the first angle of the fourth jet lies in an angular range of +5° to +20°, the second angle of the fourth jet lies in an angular range of −40° to −20°, the first angle of the fifth jet lies in an angular range of +20° to +40°, and the second angle of the fifth jet lies in an angular range of −40° to −20°.

3. The method as recited in claim 1, further comprising injecting the fuel in the form of a first, a second, a third and a fourth jet, wherein a direction of each of the jets is defined by a first angle (α) between the central axis of the injector and a projection of the central axis of the jet into the first plane and by a second angle (β) between the central axis of the injector and a projection of the central axis of the jet into the second plane, and wherein the first angle of the first jet lies in an angular range of −3° to +3°, the second angle of the first jet lies in an angular range of −3° to +3°, the first angle of the second jet lies in an angular range of −24° to −18°, the second angle of the second jet lies in an angular range of −31° to −25°, the first angle of the third jet lies in an angular range of −3° to +3°, the second angle of the third jet lies in an angular range of −25° to −19°, the first angle of the fourth jet lies in an angular range of +18° to +24°, and the second angle of the fourth jet lies in an angular range of −31° to −25°.

4. The method as recited in claim 1, further comprising injecting the fuel in the form of a first, a second, a third, a fourth, a fifth and a sixth jet, wherein a direction of each of the jets is defined by a first angle (α) between the central axis of the injector and a projection of the central axis of the jet into the first plane and by a second angle (β) between the central axis of the injector and a projection of the central axis of the jet into the second plane, and wherein the first angle of the first jet lies in an angular range of −3° to +3°, the second angle of the first jet lies in an angular range of −3° to +3°, the first angle of the second jet lies in an angular range of −40° to −20°, the second angle of the second jet lies in an angular range of −40° to −20°, the first angle of the third jet lies in an angular range of −20° to −5°, the second angle of the third jet lies in an angular range of −40° to −20°, the first angle of the fourth jet lies in an angular range of +5° to +20°, the second angle of the fourth jet lies in an angular range of −40° to −20°, the first angle of the fifth jet lies in an angular range of +20° to +40°, and the second angle of the fifth jet lies in an angular range of −40° to −20°, the first angle of the sixth jet lies in an angular range of +3° to −3°, and the second angle of the sixth jet lies in an angular range of −45° to −30°.

5. The method as recited in claim 2 further comprising generating each jet such that, for each jet pair, the central axis of one jet of the jet pair forms an angle with the central axis of the other jet of the jet pair that is larger than 15°.

6. The method as recited in claim 1, further comprising injecting each jet into the combustion chamber at a pressure greater than 200 bar.

7. The method as recited in claim 1, further comprising injecting each jet multiple times during the same combustion stroke.

8. A device for injecting fuel into a combustion chamber of a cylinder of an engine of a vehicle, comprising an injector and a hole system having four, five or six holes, wherein the injector is configured to inject the fuel into the combustion chamber through the four, five or six holes, a first plane being defined by a central axis of the injector and a central axis of the cylinder, and a second plane being defined by the central axis of the injector and a surface normal of the first plane, wherein the four, five or six holes are arranged such that at least one hole pair is formed between any two of the four, five or six holes, and wherein an angle (φ) between the a projection of a central axis of one hole of the at least one hole pair into the second plane and a projection of a central axis of the other hole of the hole pair into the second plane is smaller than 50°.

9. The device as recited in claim 8, wherein a direction of the central axis of each of the four, five or six holes determines a direction of a central axis of a jet generated via the hole.

10. The device as recited in claim 8, wherein the device is designed for carrying out a method for injecting fuel into a combustion chamber of a cylinder of an engine of a vehicle.

11. An engine having a device as recited in claim 8 for a vehicle.

12. A vehicle having a device as recited in claim 8.

13. A vehicle having an engine as recited in claim 11.

* * * * *